US010640673B2

(12) United States Patent
Roe et al.

(10) Patent No.: US 10,640,673 B2
(45) Date of Patent: May 5, 2020

(54) METHODS FOR MAINTAINING UNPAVED ROADS

(71) Applicant: CHEMTREAT, INC., Glen Allen, VA (US)

(72) Inventors: Donald Roe, Willow, NY (US); James Wilkins, Midlothian, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 113 days.

(21) Appl. No.: 15/013,375

(22) Filed: Feb. 2, 2016

(65) Prior Publication Data

US 2016/0237301 A1    Aug. 18, 2016

Related U.S. Application Data

(60) Provisional application No. 62/117,652, filed on Feb. 18, 2015.

(51) Int. Cl.
| | |
|---|---|
| C09K 3/22 | (2006.01) |
| E01H 3/00 | (2006.01) |
| C09D 133/26 | (2006.01) |
| E01C 11/00 | (2006.01) |
| E21F 5/06 | (2006.01) |
| E01C 7/35 | (2006.01) |

(52) U.S. Cl.
CPC .............. *C09D 133/26* (2013.01); *C09K 3/22* (2013.01); *E01C 7/356* (2013.01); *E01C 11/005* (2013.01); *E01H 3/00* (2013.01); *E21F 5/06* (2013.01)

(58) Field of Classification Search
CPC ... C09K 3/22; E01C 21/00; E01C 7/36; E01C 7/182; E21C 41/26; E21C 29/00
See application file for complete search history.

(56) References Cited

U.S. PATENT DOCUMENTS

| | | | | | |
|---|---|---|---|---|---|
| 3,734,873 | A | * | 5/1973 | Anderson | C02F 1/5227 523/336 |
| 4,417,992 | A | * | 11/1983 | Bhattacharyya | B09B 1/004 252/88.1 |
| 4,981,398 | A | * | 1/1991 | Field | C09K 3/22 252/88.1 |
| 5,181,957 | A | * | 1/1993 | Gross | C09K 3/22 252/382 |
| 5,256,444 | A | * | 10/1993 | Roe | B08B 17/00 252/88.1 |
| 6,099,615 | A | * | 8/2000 | Underwood | C22B 1/244 23/313 R |
| 6,281,172 | B1 | * | 8/2001 | Warren | C09K 8/24 507/110 |
| 8,492,481 | B2 | * | 7/2013 | Yeung | A61K 8/90 510/276 |
| 2009/0099707 | A1 | * | 4/2009 | Greiner | E02F 9/2045 701/1 |
| 2010/0284741 | A1 | * | 11/2010 | Vitale | E01C 21/00 404/76 |
| 2012/0196034 | A1 | * | 8/2012 | Cordani | E01H 3/02 427/136 |
| 2013/0058888 | A1 | * | 3/2013 | McChain | B01D 49/003 424/76.2 |
| 2014/0378554 | A1 | * | 12/2014 | Sexton | C08L 71/02 514/772.4 |

FOREIGN PATENT DOCUMENTS

CN          102532375 A    *   7/2012

OTHER PUBLICATIONS

Cho et al. "Dispersion Polymerization of Acrylamide in Aqueous Solution of Ammonium Sulfate: Synthesis and Characterization" (2002). Journal of Applied Polymer Science, 83, 1397-1405. DOI 10.1002/app.2300 (Year: 2002).*

* cited by examiner

Primary Examiner — Jose Hernandez-Kenney
(74) Attorney, Agent, or Firm — Oliff PLC

(57) ABSTRACT

Methods are described for maintaining unpaved roads. The methods include applying an aqueous composition to a section of an unpaved road (such as a mine haul road in a mine). The aqueous composition includes from 5 to 10,000 ppm of a synthetic polymer in water, and may be applied periodically. The synthetic polymer may be compatible with chemical processes employed by the mine, and the method may also include subsequently mining the section of the mine haul road.

20 Claims, No Drawings

METHODS FOR MAINTAINING UNPAVED ROADS

BACKGROUND

Compared to sealed (i.e., "paved") roads, unpaved roads are relatively easy and inexpensive to build because their construction does not require large machinery to pour the base material or to create a sealed surface. However, the maintenance of unpaved roads has been perpetually plagued by surface deterioration and loss of surface cohesion and road compaction due to traffic and weather. The impact of water on unpaved roads is especially pronounced because the quality of the surfacing materials is lower than in paved roads, and thus provides reduced surface protection from the elements. Water can also seep into the road base from the sides and bottom of the road's base or sub base. Unpaved roads require much more frequent maintenance as compared to paved roads, particularly after wet periods or when faced with increased traffic.

Surface deterioration is typically evidenced by "dust," which results from the loss of fine binder material from road surfaces. Dust is a substantial problem for unpaved roads, not only due to decreased road visibility, but also because the loss of these fine materials leads to other types of road distress such as loss of cohesion and compaction of the road fill material. This can create potholes and road imperfections that damage vehicle tires. Compaction and dust formation are exacerbated by high traffic conditions and heavy traffic loads.

Mining operations in particular require frequent and heavy traffic over unpaved mine haul roads. In mining operations, the mined minerals must be transported within the mine site for efficient processing. With the efficiency of modern digging equipment, tons upon tons of mineral can be quickly excavated. The excavated material is transported from the excavation point to a central processing location by truck. The more mature the mine, the longer the distance from the excavation location to the processing location. While the trucks are capable of transporting vast quantities of material in a single load, the trucks are large, heavy, and capable of creating large amounts of dust as they are driven over the roads. Further transportation is required in transporting mine waste materials, during mine reclamation, and for various other mining activities.

Typically, the mine haul roads are built with crushed aggregate from the material being unearthed, which is readily available at the mining site. It is not practical to pave the roads at an excavation site, as the excavation equipment is moved constantly and would require additional road building nearly every day. This constant road building would interrupt the flow of digging, which is carefully planned in consideration of both efficiency of removal and the safety of the road's underlying bed. Also, substantial portions of the mine haul roads are eventually mined and processed in a mineral processing plant.

Mine haul roads typically have poor water retention, and the trucks create large areas of dust when driving over the roads. The trucks continuously drive over the roads moving the minerals from the location of mining to the processing location. In this process, the weight of the heavy trucks crushes the aggregate material into finer and finer material that can be easily lifted by the truck tires. If the mine is subjected to any wind, the dust can be transported very quickly to surrounding areas. The dust can then saturate the mine and surrounding areas with airborne particulates.

When a vehicle is to be used in a high dust environment, special air filters are employed that are expensive to install and need critical maintenance to assure that no damage to the filter has occurred that would allow ingestion of the dust into the engine.

In mining operations, the unpaved roads are typically maintained by periodically spraying water onto the road surface. For example, a water truck drives over the unpaved roads and dispenses water over the road surface. It is not uncommon for a mine to spray 250,000 gallons of water a day over the roads. Although water is used to maintain the roads, the water itself can damage the road. Indeed, rain can degrade road surfaces. In particular, watering results in road surface deformation (e.g., ruts, corrugations, depressions, and potholes), as well as washing away of fine materials required for surface smoothness and optimum surface shape. As a result, more frequent road grading is required.

Mine haul roads are regulated based on industry standards for (1) new road construction; (2) frequent watering of existing roads to minimize the impact of dust on vehicle speed, production, health, and safety; and (3) grading roads as needed to maintain the optimum shape and surface smoothness for reduced haul truck tire wear and maximum safe driving speed. In order to abide by industry guidelines, mines will incur significant costs associated with purchasing, operating, and maintaining a fleet of mine water trucks and road graders (e.g., water, fuel, lubricants, filters, tires, and truck operator salary and benefits). In water scarce regions, the mine will also have to obtain the necessary water rights and pay to pump the water over a long distance. These costs can be a sizable expense.

Chemical road dust suppressants often are not a viable option for treating mine haul roads because treatment with these suppressants requires that the road be "prepared" prior to treatment and closed during application of the suppressant, which reduces mine production. Furthermore, the large amount of chemical used to stabilize the road can have a negative impact on the mineral processing plant when the road is later mined and processed.

In sum, mine haul roads require frequent maintenance to ensure optimum safety and productivity and to satisfy industry guidelines. This maintenance includes frequent watering using properly designed water trucks, and frequent grading to maintain an optimum road bed shape and smooth surface. A typical large U.S. mine has a mine haul road maintenance budget of millions of dollars per year. By improving mine haul road maintenance and operations through reducing the frequency of watering, mine operation costs can be significantly reduced.

SUMMARY

A method is provided for maintaining an unpaved road. The method includes periodically providing an aqueous composition to a section of the unpaved road. The aqueous composition includes from 5 to 10,000 ppm of a synthetic polymer in water.

Also provided is a method for maintaining a mine haul road. The method includes applying a first application of the above-described aqueous composition to a section of the mine haul road, and then after a time period in which there is no aqueous composition applied to the section of the mine haul road, applying a second application of the aqueous composition to the section of the mine haul road.

Also provided is a method for maintaining a mine haul road used in a mine that employs chemical processes to extract a raw material. The method includes applying to a section of the mine haul road the first and second applications as described above. Additionally, the synthetic polymer is compatible with the chemical processes employed by the mine, and the method includes mining the section of the mine haul road subsequent to the first and second applications.

Also provided is a method for maintaining a mine haul road used in a copper mine. The method includes periodically applying to a section of the mine haul road an aqueous composition comprising from 100 to 1,000 ppm of a synthetic cationic polymer in water, the synthetic cationic polymer having a molecular weight of from 2,000,000 g/mol (Da) to 10,000,000 g/mol.

Many modifications are possible without materially departing from the teachings of the detailed description. Accordingly, such modifications are intended to be included within the scope of the disclosure as defined in the claims.

DETAILED DESCRIPTION OF EMBODIMENTS

In this application, numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified, it is to be understood that the inventors appreciate and understand that any conceivable data point within the range is to be considered to have been specified, and that the inventors possessed knowledge of the entire range and each conceivable point and sub-range within the range.

As described herein, methods are provided for watering and maintaining an unpaved road, such as a mine haul road. The method includes watering the road with an aqueous composition comprising from 5 to 10,000 ppm of a synthetic polymer, which greatly improves the watering efficiency thereby reducing the frequency at which the road requires watering. The improved watering efficiency in turn reduces the amount of surface degradation and therefore grading required to maintain the road according to industry standards. Accordingly, improved methods for watering and maintaining mine haul roads are described.

It was surprisingly discovered by the inventors that even very small amounts of a synthetic polymer can reduce the watering frequency of unpaved roads to less than half of what would otherwise be required to maintain suitable road conditions. Reducing the watering frequency will lead to decreased incidence of surface degradation due to pothole formation, decreasing the frequency with which the roads will need to be graded. Reducing the watering frequency also results in substantial direct cost savings relating to water, watering equipment, and labor.

The above concept was tested at a large copper mine in a water scarce region in the southwestern United States. Copper processing at the mine involves a leaching process followed by solvent extraction and electrowinning (SX/EW) at a very chemically sensitive SX/EW plant. The polymer selected for testing was an aqueous emulsion containing 30 mol % of a cationic polymer (e.g., a polyacrylamide or an acrylamide/cationic acrylic acid derivative-copolymer) having a number-average molecular weight of 4,000,000-6,000,000 g/mol (Da). Through routine SX/EW chemical compatibility testing, including aqueous/organic phase separation studies and studies on the effect on crud formation, the emulsion was determined to be compatible with the mine's SX/EW process.

A short-term field evaluation was then conducted to determine the watering frequency required to maintain less than 10% visual opacity (due to dust) behind haul trucks traveling on mine haul roads as determined by a person certified in reading visual opacity. In conducting the test, a 0.5 mile test section of the road was initially watered using water alone. For each iteration, the opacity reader recorded the time between when the water truck passed by, and when the opacity reader determined that the visual opacity behind the wheels of passing haul trucks was 10%. Once 10% visual opacity was reached, the road would again be watered.

The same section of road was then watered with water containing the cationic polymer. The emulsion was injected into a water line that fills the water truck to obtain a solution containing about 250 ppm of the cationic polymer. The above watering process was repeated to determine a pattern between the length of time between road watering and 10% visual opacity. The results are summarized below. In each table, an "X" indicates when a visual opacity reading was conducted to measure the opacity behind a haul truck passing in either the east or west direction. The time after water application to reach 10% visual opacity is indicated for each test.

| Water Application 1 | | | | |
|---|---|---|---|---|
| Time | East | Opacity | West | Opacity |
| 9:14 AM | Water | | | |
| 9:16 AM | | | Water | |
| 9:19 AM | X | 5% | | |
| 9:21 AM | X | 0% | | |
| 9:26 AM | X | 5% | | |
| 9:28 AM | | | X | 0% |
| 9:28 AM | | | X | 0% |
| 9:30 AM | | | X | 0% |
| 9:33 AM | X | 5% | | |
| 9:33 AM | X | 5% | | |
| 9:35 AM | | | X | 0% |
| 9:35 AM | X | 5% | | |
| 9:38 AM | | | X | 5% |
| 9:39 AM | X | 0% | | |
| 9:42 AM | X | 10% | | |

Time: 28 min

| Water Application 2 | | | | |
|---|---|---|---|---|
| Time | East | Opacity | West | Opacity |
| 10:23 AM | Water | | | |
| 10:26 AM | | | Water | |
| 10:26 AM | X | 5% | | |
| 10:30 AM | | | X | 0% |
| 10:32 AM | | | X | 0% |
| 10:35 AM | X | 5% | | |
| 10:37 AM | | | X | 0% |
| 10:41 AM | | | X | 5% |
| 10:41 AM | | | X | 5% |

Water Application 2 (continued)

| Time | East | Opacity | West | Opacity |
|---|---|---|---|---|
| 10:47 AM | X | 10% | | |

Time: 24 min

Treatment 1

| Time | East | Opacity | West | Opacity |
|---|---|---|---|---|
| 8:47 AM | Water | | | |
| 8:50 AM | | | Water | |
| 8:54 AM | X | 0% | X | 0% |
| 8:55 AM | | | X | 0% |
| 8:58 AM | | | X | 0% |
| 9:00 AM | X | 0% | | |
| 9:02 AM | X | 0% | | |
| 9:03 AM | | | X | 0% |
| 9:06 AM | X | 0% | | |
| 9:08 AM | | | X | 0% |
| 9:09 AM | X | 0% | | |
| 9:11 AM | | | X | 0% |
| 9:13 AM | | | X | 0% |
| 9:14 AM | | | X | 0% |
| 9:15 AM | X | 0% | | |
| 9:16 AM | X | 0% | | |
| 9:20 AM | X | 0% | X | 0% |
| 9:21 AM | X | 0% | | |
| 9:24 AM | | | X | 5% |
| 9:25 AM | X | 0% | | |
| 9:27 AM | X | 0% | | |
| 9:28 AM | X | 0% | | |
| 9:29 AM | | | X | 0% |
| 9:30 AM | X | 0% | | |
| 9:32 AM | | | X | 5% |
| 9:33 AM | X | 5% | | |
| 9:36 AM | X | 0% | X | 5% |
| 9:42 AM | X | 0% | X | 5% |
| 9:47 AM | | | X | 5% |
| 9:49 AM | | | X | 10% |

Time: 62 min

Treatment 2

| Time | East | Opacity | West | Opacity |
|---|---|---|---|---|
| 9:52 AM | Water | | | |
| 9:55 AM | | | Water | |
| 10:16 AM | X | 5% | | |
| 10:24 AM | X | 5% | | |
| 10:25 AM | | | X | 0% |
| 10:27 AM | | | X | 0% |
| 10:29 AM | X | 0% | | |
| 10:31 AM | X | 5% | | |
| 10:32 AM | | | X | 0% |
| 10:34 AM | X | 5% | | |
| 10:36 AM | X | 5% | | |
| 10:39 AM | X | 5% | X | 0% |
| 10:44 AM | | | X | 5% |
| 10:45 AM | X | 5% | | |
| 10:46 AM | | | X | 5% |
| 10:50 AM | | | X | 5% |
| 10:52 AM | | | X | 10% |

Time: 60 min

As shown above, the time between required water applications was 24-28 minutes without the polymer, while the time between required water applications was 60-62 minutes when the polymer was added to the water. The addition of the cationic polymer to the water used in watering trucks therefore reduced the required water frequency by more than 50% (~57%) even though it was included at a very low dose (250 ppm). In other words, the treatment with the cationic polymer improved the effectiveness of watering such that the effect lasted 2.3 times longer than treatment with water alone. Without being bound by theory, it is believed that the polymer enhances the viscosity and cohesive properties of the water, effectively reducing the evaporation rate while increasing the water's interparticle cohesive forces relative to water's hydrogen bonding mechanism. This results in the water remaining in the road for a longer period of time and forming stronger agglomerates of the fine dust particles.

Notably, this effect was seen after just 24 hours of switching to the cationic polymer addition to the water, which indicates that the benefits are immediate. Continued application of the cationic polymer would further reduce the frequency of watering and the required surface grading. Thus, it is possible to incorporate very low doses of the polymer into water treatment programs as part of standard road maintenance programs, which is particularly useful for mine haul road maintenance. The ongoing application would result in additional beneficial effects, such as reduced grading requirements, reduced tire wear, increased truck speed/production, etc.

For mining applications where the road areas are subsequently mined, the polymer additive in the watering composition should be compatible with the mining process. In the copper mine example described above, the cationic polymer was selected to be highly compatible with the mine process. This is significant because when the road itself is eventually mined, there are no incompatible chemicals that will interfere with the mining process.

It should be recognized that the above-described example is provided to aid in an understanding of the present teachings. The example should not be construed so as to limit the scope and application of such teaching. For example, the physical form of the polymer (emulsion, dry polymer, polymer solution), as well as the polymer chemistry and molecular weight, can be selected based on the road maintenance process, the conditions and environment of the roads, and for mine haul roads, on the downstream mineral processing plant where the polymer applied to the road is ultimately incorporated into the mine processes. Using standard mineral processing lab screening procedures used in testing the potential effects of introducing new chemicals into a given process, the optimum polymer options can be evaluated to assure there are no negative impacts on mineral production.

For example, an anionic polymer may be more compatible for use in a processing plant using heap leaching, such as at a gold mine. By contrast, a cationic polymer may be more compatible with flotation and SX/EW processing. Thus, depending on the mine processes used, a cationic, anionic, or nonionic polymer may be selected so as to be compatible with the chemical processes of the mine—i.e., to have a minimal (or positive) downstream effect on mineral processing in copper, gold, or other mining operations with downstream mineral processing plants. The polymers may also be selected to be compatible with flotation processing for mining coal, or with complex flotation processes for mining ores with recoverable copper, lead, silver and zinc.

Suitable cationic polymers may include polyacrylamides, copolymers of acrylamide such as acrylamide/cationic acrylic acid derivative-copolymers as a W/O emulsion in hydrocarbons, diethylenetriamine/adipic acid/epichlorohydrin polymers, and aminomethylated polyacrylamides. The cationic polymers preferably have a high charge density (e.g., 30-100 or 40-60). Suitable nonionic polymers include polyacrylamides, and suitable anionic polymers include copolymers of acrylic acid/acrylamide copolymers. Selection may be based on process compatibility and cost considerations.

The synthetic polymer is preferably a high molecular weight polymer, and is preferably soluble in water. The number-average molecular weight of the polymer is preferably more than 500,000 g/mol, and suitable ranges include 10,000 g/mol to 10,000,000 g/mol, 50,000 g/mol to 5,000,000 g/mol, 100,000 g/mol to 3,000,000 g/mol, or 250,000 g/mol to 1,000,000 g/mol. The number-average molecular weight may be determined by techniques such as gel permeation chromatography, viscometry, colligative methods (e.g., vapor pressure osmometry), end-group determination, or proton NMR.

The physical form of the concentrated polymer prior to dilution in a water truck may be an aqueous solution (e.g., from 1 to 30 wt % polymer, or more preferably from 0.5 to 5.0 wt % polymer), a liquid emulsion (e.g., preferably an aqueous emulsion having 10 to 40 wt % polymer), or a solid polymer powder or granule. The most preferred physical form is a liquid emulsion due to the convenience of adding the polymer to the water supply and mixing prior to application to the road. The emulsion polymers may include surfactants and/or other stabilizers to maintain a stable emulsion. When a powdered polymer is used, the polymer is preferably made down as an aqueous solution prior to being added to the water supply.

The polymer may be added to water in amounts of from 5 to 10,000 ppm (by weight). More preferably, the polymer concentration ranges from 10 to 5,000 ppm, or from 50 to 2,500 ppm, and most preferably ranges from 100 to 1,000 ppm. Although other treatment additives may be included in the water with the polymer, the aqueous composition can include only the polymer as a water treatment additive. Thus, aside from the polymer, the aqueous composition can be free of components that would otherwise affect the basic and novel characteristics of improving watering frequency.

The polymer solution or emulsion may be prepared by injecting the polymer into a water line feeding the water truck. Typically, a water truck having a refillable tank for holding water will position itself at the end of a water pipe that extends from a water source. The water is discharged or pumped from the water pipe into the tank of the water truck. The solution or emulsion is preferably injected within 100 feet of the discharge end of the water pipe, with one or more piping elbows located between the polymer injection location and the discharge end of the water pipe filling the water truck to enhance mixing of the polymer in the water supply.

The roads can be watered using standard water trucks with watering equipment that apply a spray or mist of water across a section of the road as the trucks drive along the road. Each section of the road is periodically (i.e., including at regular or irregular intervals) watered by the trucks based on a predetermined watering schedule or as need requires. In each pass, the roads can be watered at a rate of about 0.1 to 10 liters per square meter of road surface ($L/m^2$), from 0.2 to 5 $L/m^2$, and preferably from 0.3 to 1 $L/m^2$. The amount of polymer applied to the road surface in each pass preferably ranges from 10 to 10,000 $mg/m^2$, from 20 to 5,000 $mg/m^2$, from 50 to 2,000 $mg/m^2$, and preferably from 100 to 1,000 $mg/m^2$. Using the polymer in these amounts surprisingly allows for a substantial reduction in watering frequency, and is very cost-effective because the improvements in watering frequency, road maintenance, and road conditions will save substantial costs as compared to the cost of the polymer that is added.

The frequency at which a section of road is watered will depend on the road environment, the type of mine, the type of road, the polymer treatment solution selected, the weather, etc. In general, the methods described above enable roads to be watered significantly less frequently than if watered without a polymer additive. To maintain a visual opacity of less than 10% as indicated above, a section of road may be watered at a frequency of once every 30 minutes to once every 4 hours, depending on the environment. For example, the section of the road may be watered at a frequency of once every 30 minutes to once every 2 hours (e.g., in a very hot and dry area with frequent truck traffic), from once every 45 minutes to once every 3 hours, or from once every 1 hour to once every 4 hours (e.g., in a cool and damp area with less frequent truck traffic).

Although only a few example embodiments have been described in detail above, those skilled in the art will readily appreciate that many modifications are possible in the example embodiments without materially departing from the disclosed methods for maintaining unpaved roads. Accordingly, all such modifications are intended to be included within the scope of this disclosure as defined in the following claims.

What is claimed is:

1. A method for maintaining an unpaved road, the method comprising:
   combining
      (i) at least one of (A) an aqueous emulsion of an acrylamide polymer having 10 to 40 wt % of the acrylamide polymer and (B) an aqueous solution of the acrylamide polymer, with
      (ii) water to form an aqueous composition comprising from 5 to 250 ppm of the acrylamide polymer; and
   periodically applying the aqueous composition to a section of the unpaved road,
   wherein the acrylamide polymer is a cationic or anionic acrylamide polymer having a molecular weight of from 2,000,000 g/mol to 10,000,000 g/mol.

2. The method of claim 1, comprising combining the aqueous emulsion of the acrylamide polymer with water.

3. The method of claim 1, comprising combining the aqueous solution of the acrylamide polymer with water.

4. The method of claim 3, wherein the aqueous solution comprises 10 to 30 wt% of the acrylamide polymer.

5. The method of claim 1, wherein an amount of the acrylamide polymer on a surface of the section of the unpaved road after applying the aqueous composition is from 10 to 2,000 $mg/m^2$.

6. The method of claim 1, wherein an amount of the acrylamide polymer on a surface of the section of the unpaved road after applying the aqueous composition is from 10 to 1,000 $mg/m^2$.

7. The method of claim 1, wherein the unpaved road is a mine haul road used in a mine that employs chemical processes to extract a raw material.

8. The method of claim 7, wherein:
   the acrylamide polymer is a cationic acrylamide polymer, and
   the mine employs at least one of (i) flotation and (ii) solvent extraction and electrowinning to extract the raw material.

9. The method of claim 8, wherein the mine is a copper mine.

10. The method of claim 7, wherein:
    the acrylamide polymer is an anionic acrylamide polymer, and the mine employs heap leaching to extract the raw material.

11. The method of claim 10, wherein the mine is a gold mine.

12. The method of claim 7, further comprising:
mining the mine haul road.

13. A method for maintaining an unpaved road, the method comprising:
combining (i) an aqueous emulsion of an acrylamide polymer with (ii) water to form an aqueous composition comprising from 5 to 1,000 ppm of the acrylamide polymer, the aqueous emulsion comprising 10 to 40 wt% of the acrylamide polymer; and
periodically applying the aqueous composition to a section of the unpaved road,
wherein the acrylamide polymer is a cationic or anionic acrylamide polymer having a molecular weight of from 2,000,000 g/mol to 10,000,000 g/mol.

14. The method of claim 13, wherein the aqueous composition comprises from 5 to 250 ppm of the acrylamide polymer.

15. The method of claim 13, wherein the unpaved road is a mine haul road used in a mine that employs chemical processes to extract a raw material.

16. The method of claim 15, wherein:
the acrylamide polymer is a cationic acrylamide polymer, and
the mine employs at least one of (i) flotation and (ii) solvent extraction and electrowinning to extract the raw material.

17. The method of claim 16, wherein the mine is a copper mine.

18. The method of claim 15, wherein:
the acrylamide polymer is an anionic acrylamide polymer, and
the mine employs heap leaching to extract the raw material.

19. The method of claim 18, wherein the mine is a gold mine.

20. The method of claim 15, further comprising:
mining the mine haul road.

* * * * *